A. E. SCHAEFER.
PROCESS OF EXTRACTING SALT FROM NATURAL BRINES.
APPLICATION FILED MAR. 3, 1916.
1,297,737. Patented Mar. 18, 1919.
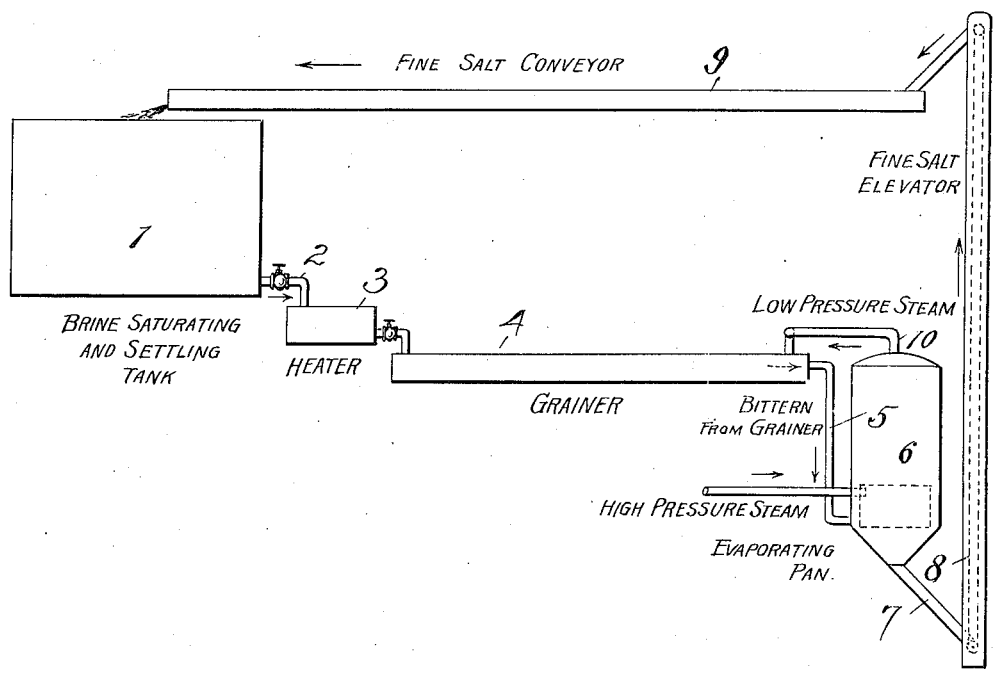
Inventor
Arthur E. Schaefer
by Thurston & King
attys.

UNITED STATES PATENT OFFICE.

ARTHUR E. SCHAEFER, OF SAGINAW, MICHIGAN.

PROCESS OF EXTRACTING SALT FROM NATURAL BRINES.

1,297,737.

Specification of Letters Patent. Patented Mar. 18, 1919.

Application filed March 3, 1916. Serial No. 81,853.

*To all whom it may concern:*

Be it known that I, ARTHUR E. SCHAEFER, a citizen of the United States, residing at Saginaw, in the county of Saginaw and State of Michigan, have invented a certain new and useful Improvement in Processes of Extracting Salt from Natural Brines, of which the following is a full, clear, and exact description.

This invention relates to a process for extracting salt from natural brines. The object of the invention is to provide a process whereby fine salt containing very few impurities, coarse grain salt which may be slightly impure and fine grain salt which contains a greater percentage of impurities, is formed, the coarse grain salt in certain aspects of my process being more economically extracted and in larger quantities than is at present possible from brines that are not saturated before treatment.

Generally speaking, the invention comprises the steps of the process defined in the claims.

Reference should be had to the accompanying drawings forming a part of this specification in which the showing is diagrammatic of an apparatus by which my process may be carried out.

At the present time it is customary to evaporate unsaturated brines in multiple effect vacuum pans, which produces a fine effect grain salt after the evaporation has proceeded sufficiently far to effect a saturation of the solution. It is the purpose of my process to produce a practically pure fine grain salt in one stage of the process, and a coarse salt at another stage of the process, or, if desired, the coarse grain salt may be made the principal ingredient to be recovered, all of which will appear more in detail. By coarse salt I mean anything which is coarser than salt commonly known in the trade as No. 1 granulated.

The first step of my process is to treat a solution of natural brine by adding salt to it until the brine solution becomes saturated.

Preferably the salt thus added to saturate may be a fine grain salt such as that produced in a later step in my process, or such fine salt may be obtained from any other source.

After the solution has become saturated it is treated for the removal of certain of the impurities in the usual manner at present used in removing such impurities from the brine solution.

At this point the remaining steps in the process may be varied according to whether it is desired to produce a substantially pure fine grain salt and also a coarse grain salt, or whether it is desired to produce principally a coarse grain salt and a fine grain salt as a by-product.

We will first discuss the steps in the process where it is desired to produce a substantially pure fine grain salt as well as a coarse grain salt, and to do this the saturated solution is first run into closed evaporators in which the evaporation of the solution is very rapid. This throws down a fine grain salt which is comparatively pure and is entirely suitable for table and cooking use.

The solution remaining is next run into open evaporating pans and the solution is further evaporated but quite slowly, under which conditions there is thrown down a coarse grain salt which contains a slight amount of impurities, but this is not at all damaging to the product as its use is for stock feeding and similar purposes.

The remaining solution is next run into closed pans and rapidly evaporated where again a fine grain salt is produced. This last salt contains a considerable percentage of impurities and is not suitable for commercial purposes. It, however, is entirely suitable to be used in connection with the first step of my process, viz: as a fine grain salt for saturating an original solution of natural brine.

The liquor remaining after the third production of salt will contain only a very small amount of the original salt,—often as low as 1%. This liquor may be discarded.

It will be obvious from the foregoing description of my process that the process may be manipulated to produce the desired relative amounts of fine grain salt and coarse grain salt by varying the time of evaporation of the solution during any particular step of my process. Of course in the last step of the process the object is to continue the treament until substantially all of the salt is removed from the solution.

If it be desired to proceed directly with the production of a coarse grain salt, the original brine solution is, after being saturated, run into open evaporating pans where the evaporation is quite slow, which results in producing a coarse grain salt. The evaporation is continued until substantially no further coarse grain salt is produced and then the remaining solution is run into closed evaporating pans where the solution is rapidly evaporated thereby producing a fine grain salt. At the end of the evaporation which produces fine grain salt the remaining liquid contains but very little salt and may be discarded. The fine grain salt thus produced may be used in connection with the saturation of an original brine solution, as disclosed in the first step of my process, and it also may be sold as a commercial article.

In connection with the evaporation of the solution during the production of coarse grain salt an exhaust or low pressure steam may be conveniently used, while in connection with the evaporation of the fine grain salt the heat may be supplied by means of steam under pressure such as would be supplied by the boiler.

The process which has just been described has many advantages over any process at present used with which I am familiar, one distinct advantage being that when using brines containing considerable impurities there is no "sour" bittern produced in my process, whereas it frequently happens with such processes as are usually employed in treatment of natural brines that it is necessary to throw away a "sour" bittern in which the impurities have concentrated to such an extent that salt will no longer separate but which solution may, nevertheless, still contain as much as 25% of the salt in the original brine.

Furthermore, I find that by the methods herein disclosed I can obtain a greater yield of coarse salt that is possible with methods as at present employed. For instance, if a brine solution gives a salometer test of 80 degrees I can, by treating such a brine solution in the manner herein described, obtain a yield of about 25% more coarse salt than when treating such a solution by the usual processes. Brines giving other salometer tests will by my process yield coarse salt in substantially the same proportion to their strength and composition.

The process may be carried on in such an apparatus as is diagrammatically shown in the drawing, in which 1 represents a tank adapted to contain a desired quantity of brine solution. From this tank there is an outlet as indicated at 2 which leads through a heating device 3. From the heating device the material passes into a grainer or evaporating pan 4 which may be of usual construction. From the grainer there is a connection 5 to the closed evaporating pan 6. From the bottom of the inclosed pan 6 there is a chute 7 which communicates with an elevator 8 which carries the salt upward to a conveyer 9 by which conveyer the fine salt may be delivered to the tank 1.

The bittern within the evaporating chamber 6 is evaporated through coils supplied with steam under high pressure, so that the evaporation of the liquor is rapid. The vapors from this evaporation pass from the upper part of the chamber 6 through the pipe 10 to the coils within the grainer 4. The vapor which is thus supplied to the coils within the grainer 4 is a low pressure steam and causes the evaporation of the solution within the grainer 4 to be rather slow, which assists in the production of the coarse grain salt.

This particular form of apparatus is merely illustrative and should by no means be taken as a limitation upon the process disclosed herein.

The process heretofore described may be modified more or less without departing from the spirit of this invention. For instance: The natural brine solution, after being brought to the point of saturation by the addition of salt, may be passed through a series of two or more evaporating pans or grainers. In the first pan or grainer the evaporation being slow, would produce a coarse grained salt which would be readily salable. The salt from the second and subsequent grainers would be of darker color because it would contain more of the impurities which existed in the original solution. This darker colored salt could be utilized to bring the original unsaturated brine up to a saturated condition. By this modified process just described practically no fine grain salt would be produced, as the salt in the second and subsequent pans would be a coarse grain salt, but would be colored by impurities. However, the final bittern or solution which would be removed from the last grainer would contain very little of the salt in the original brine in solution.

It will be seen that the principle underlying the modification just described is the same as that underlying the processes originally described, that is to say, bringing an original brine solution to a saturated condition by the addition of salt to the original brine solution, then evaporating the brine, thereby to produce a coarse or medium grain salt, then the further evaporation of the brine solution to take out all the salt or substantially all the salt that remains in the solution.

Having thus described my invention, what I claim is:—

1. The process of extracting salt from brine which consists in adding salt to the brine until the brine is in a substantially saturated condition, then in successively evaporating the said brine at different rates to produce salt of different fineness.

2. The process of extracting salt from unsaturated brine, which comprises adding salt to the brine until the brine is in a substantially saturated condition, then in slowly partially evaporating the saturated salt solution, thereby producing a coarse grain salt, and subsequently draining off the solution left after the coarse grain salt is produced.

3. The process of extracting salt from unsaturated brines, which comprises adding salt to the brine solution until the brine is substantially saturated, then in slowly partially evaporating the saturated solution, thereby producing a coarse grain salt, then draining off the solution left after the coarse grain salt is produced and treating the said solution to extract the remaining salt that may be therein.

4. The process of extracting salt from unsaturated brines, which comprises adding salt to the brine solution until the brine is substantially saturated, then in slowly partially evaporating the saturated solution, thereby producting a coars grain salt, then draining the solution from the coarse grain salt and rapidly evaporating said solution, thereby producing a fine grain salt, then draining off the solution remaining after the fine grain salt is formed.

5. The process of extracting salt from unsaturated brines, which comprises adding to the original brine salt which is produced by a later step in the process until the original brine solution is substantially saturated, then in slowly partially evaporating the saturated solution, thereby producing a coarse grain salt, draining off the solution left after the coarse grain salt is produced and recovering the salt in said solution to be used for the purpose of saturating an original brine solution, as set forth in the first part of this claim.

6. The process of extracting salt from unsaturated brines, which comprises adding a fine grain salt to the brine until the brine is substantially saturated, then in slowly partially evaporating the saturated solution, thereby producing a coarse grain salt, draining off the solution left after the coarse grain salt is produced, and rapidly evaporating said solution until a fine grain salt is deposited and then draining off the solution from the fine grain salt.

In testimony whereof I hereunto affix my signature in the presence of two witnesses.

ARTHUR E. SCHAEFER.

Witnesses:
   SAMUEL E. BRIERTON,
   ISABEL R. DORAN.